United States Patent [19]

Kroger et al.

[11] 4,437,761
[45] Mar. 20, 1984

[54] REFRACTIVE INDEX TEMPERATURE SENSOR

[75] Inventors: Harry Kroger, Sudbury; Richard A. Soref, Newton Centre, both of Mass.

[73] Assignee: Sperry Corporation, New York, N.Y.

[21] Appl. No.: 248,614

[22] Filed: Mar. 27, 1981

[51] Int. Cl.³ .......................... G01J 5/08; G01J 5/58
[52] U.S. Cl. ........................................ 356/44; 374/161
[58] Field of Search ............... 356/43, 44, 352, 361, 356/445; 250/231 R, 231 P, 227; 350/96.2, 96.18; 374/131, 161

[56] References Cited

U.S. PATENT DOCUMENTS

| 3,466,565 | 9/1969 | Rigrod | 372/94 |
| 4,016,761 | 4/1977 | Rozzell et al. | 356/44 |
| 4,140,393 | 2/1979 | Cetas | 356/44 |
| 4,201,446 | 5/1980 | Geddes et al. | 356/44 |
| 4,329,058 | 5/1982 | James et al. | 356/352 |
| 4,356,396 | 10/1982 | Ruell et al. | 250/227 |

FOREIGN PATENT DOCUMENTS 184480 7/1966 U.S.S.R. ........................... 356/445

OTHER PUBLICATIONS

Beysens, "Simple, Reliable, and Sensitive Interferometer for the Measurement of the Refractive Index of Liquids as a Function of Temperature", Rev. Sci. Instrum. 50(4), Apr. 1979, pp. 509-510.

Primary Examiner—Vincent P. McGraw
Attorney, Agent, or Firm—Howard P. Terry

[57] ABSTRACT

An optical temperature sensor and method of manufacture therefor in which the intensity of light reflected from a first dielectric interface or from first and second dielectric interfaces, wherein one of the dielectrics has a temperature dependent index of refraction is measured. The intensity of light refleted from such dielectric interfaces will vary depending on the index of refraction which in turn is temperature dependent, thus providing a temperature dependent light signal.

20 Claims, 13 Drawing Figures

REFRACTIVE INDEX TEMPERATURE SENSOR

BACKGROUND OF THE INVENTION

1. Field of the Invention

This invention pertains to the measurement of temperature using optical techniques and more particularly relates to an apparatus for determining temperature utilizing a sensor material having a thermally dependent refractive index.

2. Description of the Prior Art

Present technology utilizes thermistor beads having a temperature dependent resistance characteristic, wherein the thermistor's resistance is monitored to yield an indication of temperature. Such sensors, however, suffer from various disadvantages including susceptibility to electromagnetic radiation interference and the noise produced thereby. Furthermore, the flow of sensing current through the thermistor element may cause a temperature rise in the sensor, thus rendering such sensors inaccurate. These sensors are also bulky, slow responding, and costly to produce.

Optical sensors have the advantage of being relatively insensitive to electromagnetic interference as well as being small in size and adaptable to inexpensive manufacturing techniques. Optical sensors known in the art include birefringent digital temperature sensors which exploit temperature dependent birefringence effects of various crystals. In such a sensor, a source spectrum is transmitted by a fiber bundle through a polarizer. The polarization vector of the resulting light is then rotated by the birefringence cell through an angle which is dependent upon the temperature. A second polarizing filter is then used to convert the polarization changes into intensity changes. Such a sensor, however, requires the use of costly birefringent crystals and has a limited dynamic range. A further optical temperature sensor known in the art exploits the temperature dependent phosphorescence decay time of phosphors. In sensors of this nature a phosphor bonded to one end of a fiber optic light guide is illuminated with pulsed laser light. By examining the decay time of the phosphorescence emitted by the phosphor, a temperature measurement may be made. Such a sensor, however, requires complex electronics and has a slow response time.

The present invention provides a compact, simple, and economical apparatus having fast response for measuring temperature at remote and non-remote locations.

SUMMARY OF THE INVENTION

In a preferred embodiment of the first surface temperature sensor, a layer of sensor material having first and second surfaces and a temperature dependent index of refraction $n_2$, such as amorphous hydrogenated silicon, is coupled to an optical fiber core having an index of refraction $n_1$, forming a dielectric interface therebetween. The intensity of light reflections resulting from light incident to the dielectric interface will depend on the index of refraction $n_2$, which in turn is temperature dependent, thereby providing a light signal whose intensity is temperature dependent. The intensity of such a light signal may be detected and utilized to provide an indication of temperature.

In another embodiment of the first surface optical temperature sensor, the ratio of hydrogen to silicon in amorphous hydrogenated silicon is smoothly varied to provide a changing light absorption characteristic across a cross-section of the layer of amorphous hydrogenated silicon, thereby becoming increasingly opaque to light incident thereon and consequently substantially reducing reflections from the second surface of the layer. The method for fabricating the optical temperature sensor including amorphous hydrogenated silicon having a smoothly varying ratio of hydrogen to silicon comprises varying the partial pressure of hydrogen in the atmosphere in which silicon is r.f. sputtered onto a substrate.

In the preferred embodiment of the interferometric temperature sensor, a layer of sensor material having a temperature dependent index of refraction $n_2$, such as amorphous hydrogenated silicon is coupled to an optical fiber core having an index of refraction $n_1$ to form an etalon type interferometer in which the reflections of light resulting from light having approximately normal incidence to the first and second surfaces are utilized. The light reflected from the first and second surfaces resulting from light having substantially normal incidence thereupon will constructively and destructively interfere and therefore the light intensity will vary depending upon the index of refraction of the sensor material $n_2$, which in turn depends upon temperature, thereby providing a light signal, the intensity of which is temperature dependent. The intensity of such a light signal may be detected and utilized to provide an indication of temperature.

DESCRIPTION OF THE PREFERRED EMBODIMENTS

Figure 1:
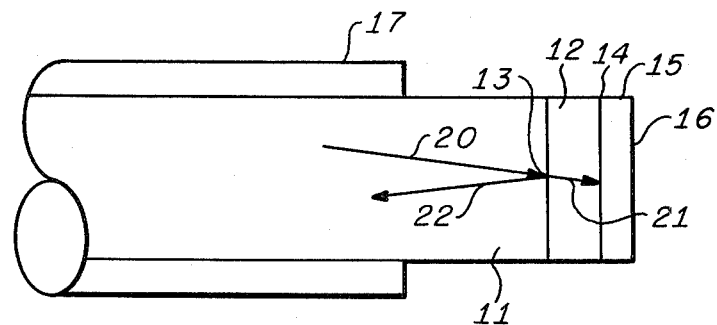
FIG. 1 is a diagram of a first surface temperature sensor in accordance with the present invention.

Referring to FIG. 1, a fiber optic first surface optical temperature sensor includes an optical fiber 11 coupled to a film of sensor material 12 forming dielectric interface 13, sensor material 12 being in turn coupled at interface 14 to reflection inhibiting material 15 which has a surface 16. Optical fiber core 11 may be surrounded by cladding 17. In the preferred embodiment, optical fiber core 11 is a multimode optical fiber and sensor material 12 comprises amorphous hydrogenated silicon, a-(Si:H). The hydrogenated silicon sensor material may be deposited by r.f. sputtering in a gas mixture of hydrogen, argon and phosphorous. In addition, other useful sensor materials would include Si, Ge, a-(Se), a-(Ge:H), CdS, CdSe, AlSb, CdSSe, GaAs, GaAlAs, InP and other substances selected from the 3-5 and 2-6 compounds of the periodic table of the elements.

The sensor material may be deposited by r.f. sputtering, thermal evaporation, inductively coupled r.f. plasmas or by E-beam evaporation depending on the material selected. Alternatively, the sensor material may be deposited on a film of glass and polished, the glass cut to a small disc, and the small disc thereafter attached to the fiber using transparent cement. Although any optical fiber core material may be used, silica, is preferred. The fiber may be single mode or multimode and may have any diameter, any numerical aperture, and may have either a graded or step index profile.

It is well known in the optical art that light incident on the interface between two dielectrics having differing indices of refraction $n_1$ and $n_2$ will be reflected, transmitted, or both reflected and transmitted depending upon the indices of refraction and the angle of incidence. For light incident upon an interface between the first and second dielectrics having indices of refraction $n_1$ and $n_2$, respectively, the percentage of reflected power reflected from the interface will be $$R = \frac{(n_2 \cos\theta_2 - n_1 \cos\theta_1)^2}{(n_2 \cos\theta_2 + n_1 \cos\theta_1)^2} \tag{1}$$

Where $\theta_1$ equals the angle of incidence and $\theta_2$ equals the angle of the refracted light propagated through the dielectric having an index of $n_2$. Referring again to FIG. 1, light rays 20 having normal incidence at the dielectric interface 13 between optical fiber core 11 and sensor material 12 having index of refractions $n_1$ and $n_2$, respectively, will be partially transmitted as shown by light ray 21 and partially reflected as shown by light ray 22. Since light rays emerging from optical fiber core 11 emerge in a cone having a small angle such light approximates the normal incidence on interface 13. Substituting 0° for $\theta_1$ and $\theta_2$ corresponding to light impinging upon the dielectric interface 13 for normal incidence, equation (1) becomes:

$$R = \frac{(n_2 - n_1)^2}{(n_2 + n_1)^2} \tag{2}$$

Thus, if the indices of refraction of fiber core 11 or sensor 12 change with respect to one another, then the reflectance power R will also change.

In the instant invention, temperature dependent changes in the $n_2$, of sensor material 12 in response to temperature changes, $\Delta n_2/\Delta T$, are utilized to sense temperature changes. Many semiconductors, including those mentioned hereinabove, exhibit such a temperature dependent index of refraction. It has been suggested that $\Delta n_2/\Delta T$ for amorphous silicon is approximately the same as that for crystalline silicon since the retention of the short range order in the amorphous phase provides an average interband separation similar to that occurring in crystalline silicon. Thermally induced index of refraction changes in crystalline silicon have been found to be related to two effects: (1) volume changes, that is expansion and contraction of the crystalline lattice, and (2) electron-phonon scattering effects at constant volume. Considering the crystalline lattice as composed of individual single oscillators, volume changes will lead to an increase or decrease in the number of oscillators per unit volume, since temperature changes cause an increase in volume but do not affect the mass of the material.

It is well known that the energy band gap of a semiconductor is temperature dependent as related by the equation $$E_g(T) = E_g(0) - K_1 T^2/(T+K_2) \tag{3}$$

where $E_g(0)$ = the band gap energy at 0° Kelvin;
T = temperature in degrees Kelvin; and
$K_1$ and $K_2$ are material constants.

If a single oscillator model is used to approximate the behavior of crystalline silicon, then the value of the index of refraction n in terms of energy band gap and frequency may be related by the following equation:

$$n^2 = 1 + A/(E_g^2 - (h\gamma)^2) \tag{4}$$

where A is proportional to the electron density,
$\gamma$ = the frequency of the illuminating light,
h = Planck's constant.
Then, $$\frac{1}{n} \frac{dn}{dT} = -\frac{(n^2-1)E_g}{(n^2)E_g^2 - (h\gamma)^2} - \frac{3\beta}{2n^2} \frac{n^2-1}{} \tag{5}$$

where $\beta$ = the thermal expansion coefficient for the material.

The first term is dependent upon the energy band gap and the second term is dependent upon the thermal expansion coefficient for the crystal.

Although the index shift $\Delta n_2/\Delta T$ for the sensing material may be small, the change in reflectance power R may be large. Selecting an optical fiber core 11 having a negligible $\Delta n_1/\Delta T$, differentation of equation (2) shows that:

$$\frac{\Delta R}{\frac{R}{\Delta T}} = \frac{4n_1}{\left(\frac{n_2-n_1}{n_2+n_1}\right)} \frac{\Delta n_2}{\Delta T} = \frac{4n_1}{\sqrt{R}} \frac{\Delta n_2}{\Delta T} \tag{6}$$

For amorphous hydrogenated silicon at 22° C. for an incident light ray 20, having a wavelength of 633 nanometers, sensor material 12 having an index of refraction $n_2$ of 3.095, and a band gap edge at 585 nanometers, coupled to an optical fiber 11 having an index of refraction $n_1$ = 1.47, equation (2) yields R = 0.127. In silicon's transparency region (approximately 1,500 nanometers) $\Delta n_2/\Delta T$ is thus approximately $2.4 \times 10^{-4}/°C.$, yielding a reflectance power change $\Delta R/\Delta T$ of 0.4% per degree centigrade. Such a change in reflectance is easily detected utilizing methods known in the art.

The selection of the wavelength of the incident light is not critical; the peak wavelength can satisfactorily be chosen in the range from $\lambda = 500$ nanometers to 1,500 nanometers for a-Si:H. In practice, one may either choose the light source to approximately match the sensor material or tailor the sensor material to match the particular source chosen, as discussed below.

The composition of the hydrogenated silicon can be tailored during the r.f. sputtering process by adjusting the partial pressure of the hydrogen present during sputtering. By varying the partial pressure of hydrogen present during sputtering, compositions ranging from 20% hydrogen/80% silicon, to pure silicon may be obtained using this method. The fundamental energy band gap edge of hydrogenated silicon may be adjusted over a range of approximately 550 to 1100 nanometers.

Figure 2:
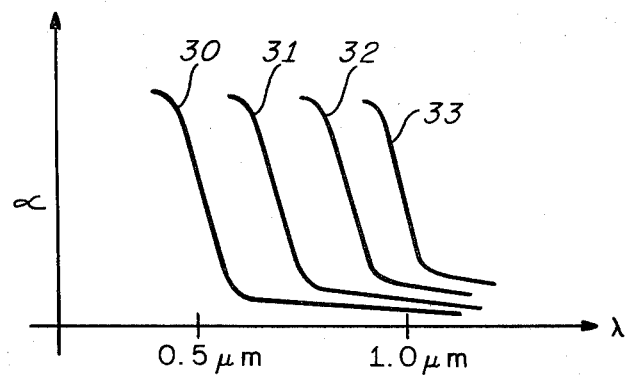
FIG. 2 is a graph useful in explaining the operation of the present invention.

The optical properties of such compositions vary smoothly from one composition to the next as shown in FIG. 2, wherein are shown four a-Si:H samples having varying hydrogen/silicon ratios and their resulting characteristics shown by curves 30 to 33. Selection of the appropriate composition, thus provides a convenient method for tailoring the sensor composition to the light source and fiber optic material utilized.

Using this sputtering process the composition of a hydrogenated silicon film 12 may be graded from the interface 13 to interface 14 with an accompanying variation of thermooptic properties. This is accomplished by removing hydrogen gas from the system as the sputtering process proceeds. For example, a film comprising 20% hydrogen and 80% silicon may be formed at the fiber optic interface 13 (FIG. 1) with a gradual change in the film until it becomes pure silicon as one moves farther from the interface 13 to interface 14. Such a graded composition film has important properties as will be further described.

Figure 3A:
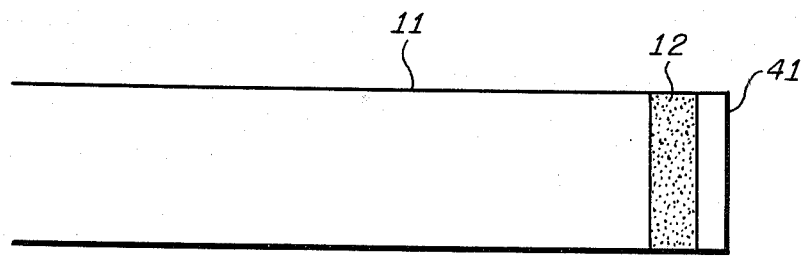
FIGS. 3A through 3E are diagrams of alternative embodiments of the temperature sensor in accordance with the present invention.
Figure 3B:
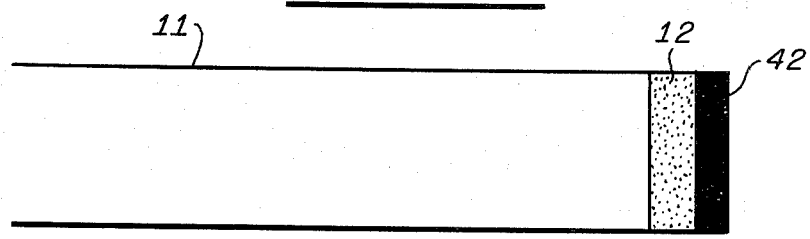
Figure 3C:
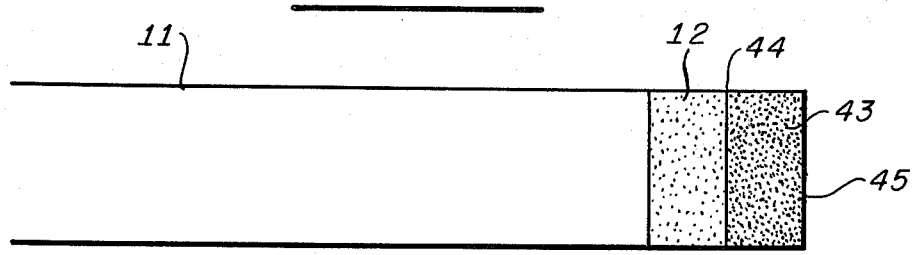
Figure 3D:
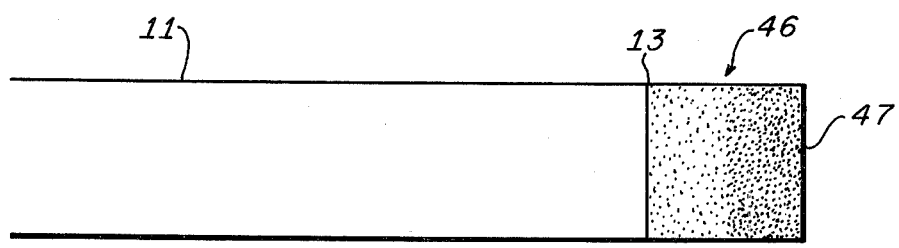
Figure 3E:
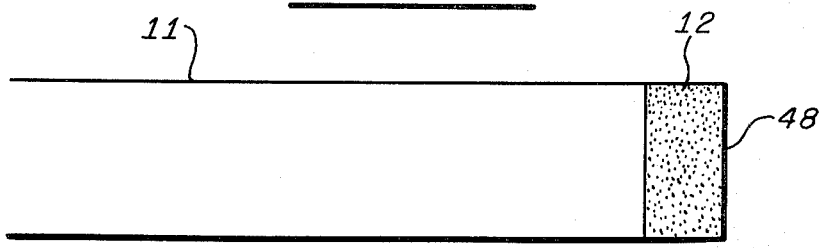

The first surface optical temperature sensor described thus far utilizes only changes in reflection at the optical fiber-sensor film interface 13. It is thus necessary to suppress reflections that occur at interface 14 of sensor material 12. This can be accomplished in several ways as shown in FIGS. 3A through 3E. In FIG. 3A, anti-reflection coating 41 is shown aligned with sensor material 12. Anti-reflection coating 41 is a dielectric well known in the art selected so that all reflections at interface 14, which is adjacent to anti-reflection coating 41, are inhibited. In FIG. 3B a black, absorbing film is placed in alignment with sensor material 12 which will absorb substantially all light incident thereupon. In FIG. 3C, a material whose refractive index closely matches that of the sensor material 12 is aligned therewith. Material 43 is further selected to be opaque at the optical source wavelength. Since the refractive index of material 43 substantially matches that of sensor material 12, there will be little or no reflection at the interface 44 therebetween. Furthermore, as the light propagates through material 43, it is absorbed since material 43 is selected to be opaque at the frequency of interest; there is therefore substantially no reflection from surface 45. In FIG. 3D, a structure utilizing the graded composition hydrogenated silicon discussed above is shown. When the graded composition material is used for sensor film 46, the index of refraction and the optical absorption coefficient may be smoothly varied from interface 13 where it comprises an a-Si:H mixture to a second surface 47, where it is nearly pure silicon. As the light propagates through graded material 46, it is absorbed so that there is substantially no reflection from surface 47. FIG. 3E shows a basic structure comprising sensor material 12 in which the wavelength of the incident light source is approximately 500 Angstroms less than the wavelength of the band edge gap. Since the incident light will thus fall within the absorbing region of the sensor material 12, there will be little or no reflection from surface 48.

Figure 4:
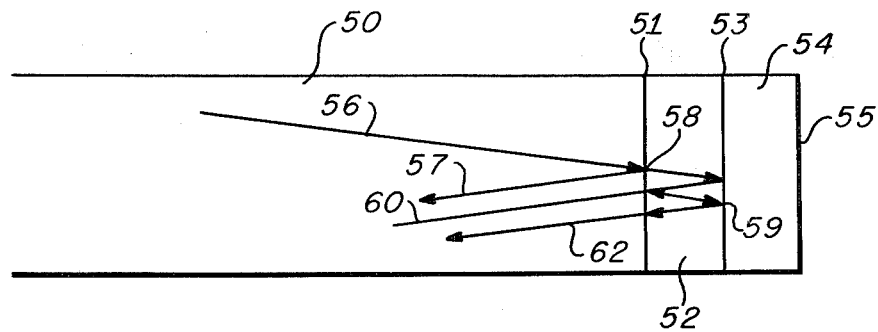
FIG. 4 is an interferometric temperature sensor in accordance with the present invention.

In the embodiment of the invention shown in FIG. 4, the second surface reflections are not suppressed but are utilized to provide an interferometric sensor similar in operation to that of a Fabry-Perot Etalon. In FIG. 4, the optical fiber core 50 having an index of refraction $n_1$ is coupled at surface 51 to sensor material 52 that has a temperature dependent index of refraction $n_2$, and is in turn coupled at surface 53 to dielectric 54 which has an index of refraction $n_3$ and a surface 55. Sensor material 52 has a thickness D and may be of the same semiconducting sensor material as previously described, for example, amorphous hydrogenated silicon, while dielectric 54 may be any material having an index of refraction different from the sensor material, preferably lower, and including, for example, air.

Refer again to FIG. 4. In operation, light ray 56 propagates through optical fiber core 50 and has approximately normal incidence to surface 51 (light ray 56 is shown deviating from normal incidence for clarity). At surface 51, a portion of the light will be reflected as shown by light ray 57 and a portion will continue to propagate through sensor material 52 as shown by light ray 58 until it strikes second surface 53 whereat a portion will be reflected as light ray 59. Additional light rays will be reflected and propagated between the first surface 51 and second surface 53 as shown. Emerging light rays 57, 60 and 62 will interfere with one another in constructive and destructive interference. The optical performance of thin films such as those utilized herein is well known in the art. The reflectance power R on a non-absorbing substrate such as optical fiber core 50 for light rays having normal or nearly normal incidence is:

$$R = \frac{(n_3 - n_1)^2\cos^2\beta + \left(\frac{n_3 n_1}{n_2} - n_2\right)^2 \sin^2\beta}{(n_3 + n_1)^2\cos^2\beta + \left(\frac{n_3 n_1}{n_2} + n_2\right)^2 \sin^2\beta} \qquad (7)$$

where $\beta = (2\pi n_2 D)/\lambda$ at normal incidence,
$\beta = (2\pi n_2 D \cos\phi)/\lambda$ at slight deviations from normal incidence.

Figure 5:
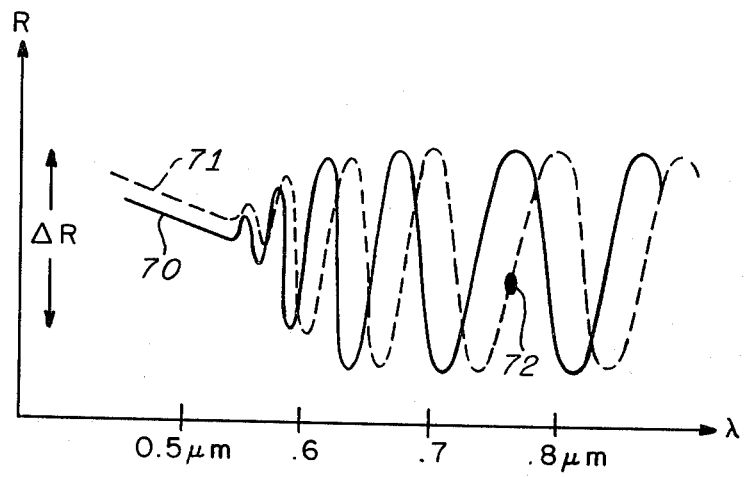
FIG. 5 is a graph useful in explaining the operation of the present invention.

Refer now to FIG. 5 which shows the reflectance power R versus wavelength for a smooth, parallel 1100 nanometer thick amorphous hydrogenated silicon film in accordance with equation (7). Curve 70 shows an oscillatory interference pattern at a temperature $T_1$, whereas curve 71 shows the interference pattern found at a temperature $T_2$ which has the same oscillator pattern shifted along the abscissa. From equation (7), it is clear that if $n_2$ is temperature dependent, the reflectance power will change for different temperatures as shown in FIG. 5. It is equally clear that in order to insure best results, optical fiber core 50 and superstrate 54 should have indices of refraction $n_1$ and $n_3$, respectively, that are relatively independent of temperature changes.

A substantially monochromatic light source selected to have its central wavelength near the midpoint of a side of one of the sinusoidal cycles in the sensor material's transparent range, as shown for example by point 72, is preferably used to illuminate the etalon sensor. Since such a wavelength lies on curve 71 in its region of maximum linearity and slope, changes in R, such as $\Delta R$ in FIG. 5 may be used in a temperature sensor having high resolution and linearity.

Those skilled in the art will recognize that changes in the thickness D of sensor film 52 (FIG. 4) due to thermal expansions and contractions will also affect the reflectance power R and may need to be included in the calibration of the interferometric sensor of the present invention. Reflectance changes due to thermal expansion and contraction of a sensor material such as a-Si:H are substantially smaller than the reflectance changes due to the change in the index of refraction, and may in many instances be ignored.

It is well known in the art that an etalon type interferometer will yield a series of circular fringes in the well known interference pattern. Equation (7) describes the case in which one observes primarily the central fringe at normal incidence or at slight deviations therefrom. In practice, the light from the fiber fore 50 having index of refraction $n_1$, does not emerge in a parallel-on axis beam. The light will emerge from the fiber core 50 in a cone of rays with a maximum half angle of $\theta_1$ relative to the fiber axis. When entering sensor material 52 having index of refraction $n_2$ greater than $n_1$, this angle is decreased in accordance with Snell's Law of refraction $\theta_2 = n_1/n_2 \times \theta_1$. The angle $\theta_1$ may be determined from the numerical aperture (N.A.) according to the relation $\sin \theta_1 = N.A.$ For a sensor where $n_1 = 1.5$ and $n_2 = 3.8$, then $\theta_2 = 1.5/3.8$, then $\theta_2 = 1.5/3/8 \times \theta_1 = 0.39 \theta_1$. If, for example, the numerical aperture equals 0.20, then $\theta_1 = 11.5°$ and $\theta_2$ will equal 4.5°, which provides light rays having an angle of incidence upon sensor material 52 that is close enough to normal so that light from substantially only the central fringe is returned and equation (7) is predictive of the sensor performance. Furthermore, integrating equation (7) over the full range of light ray angles (in this example 4.5°), as occurs in a multimode optical fiber averages the nonnormal incident light. This averaging in effect occurs over the 4.5° cone and yields a response substantially the same as if the incident light were restricted to purely normal incidence.

Typically, the thickness of the sensor film D, would approximate the wavelength of the light used to illuminate the sensor material, for example, 1000 to 3000 nanometers.

Figure 6A:
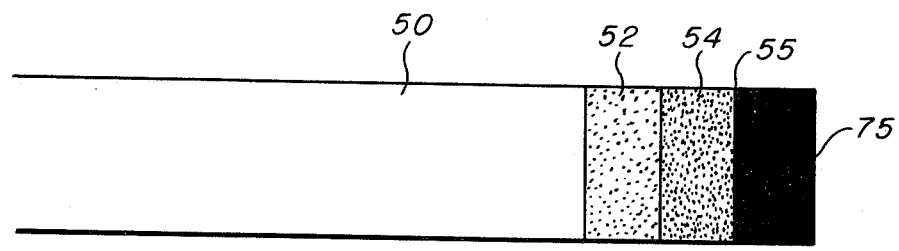
FIGS. 6A and 6B are alternative embodiments of the temperature sensor according to the present invention.
Figure 6B:
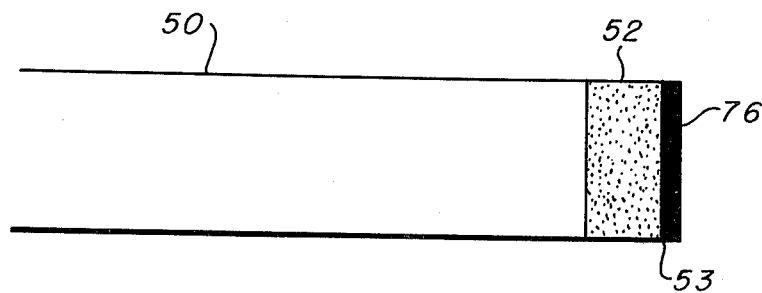

In addition to the basic structure described in FIG. 4, an optical absorber 75 as shown in FIG. 6A may be added to surface 55 to minimize interference from external light sources. In FIG. 6B a metal film 76 has been added at surface 53 to provide reflection in lieu of dielectric 54 while simultaneously minimizing interference from external light sources and protecting the dielectric surface.

In operation, it is necessary to collect light reflected from either the first surface reflective sensor or the etalon type sensor and channel it to a detector, while segregating the return light from the light incident to the sensor material. Two structures useful for accomplishing this function are shown in FIGS. 7 and 8.

Figure 7:
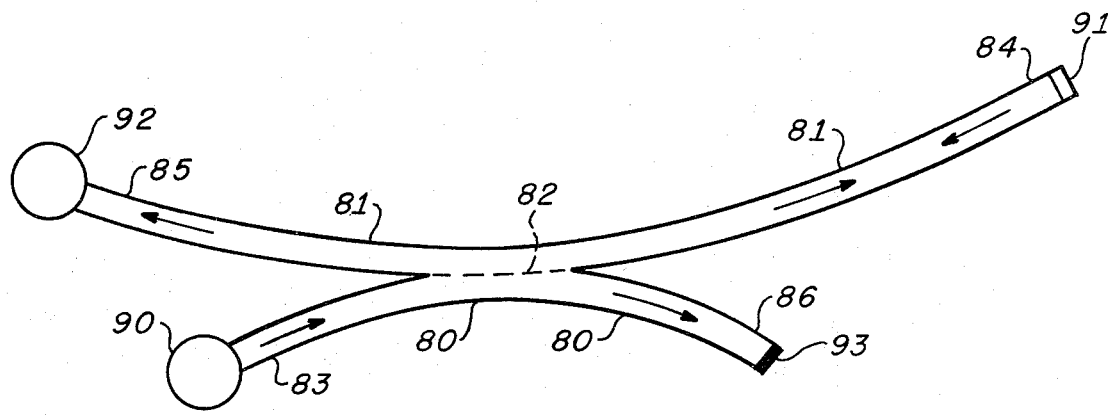
FIG. 7 and FIG. 8 are block diagrams of the temperature detector systems in accordance with the present invention.

In FIG. 7, a fused fiber coupler comprising fibers 80 and 81 are physically fused at junction 82 which forms an optical directional coupler having input ports 83 and 84 and output ports 85 and 86. Optical light source 90 is coupled to input port 83 and sensor 91 is coupled to input port 84. Optical detector 92, which is used for detecting the intensity of light reflected from the sensor 91, is coupled to an output port 85, the remaining end of optical fiber 80 terminates at optical port 86 into an absorber 93 which absorbs substantially all light incident thereon. In operation, light incident from optical light source 90 propagates through fiber 80 and at junction 82 couples into fiber 81 propagating in a direction towards sensor 91. At sensor 91, in accordance with the principles previously disclosed, light will be reflected depending upon the temperature of sensor 91 and propagate through fiber 81 to detector 92 where the intensity of the reflected light maybe determined. Since a portion of the light from optical source 90 will continue to propagate in optical fiber 80 past junction 82, it may be absorbed by absorber 93 to prevent unwanted reflections and thereby decrease noise.

If fiber 81 has a larger core diameter than fiber 80, the ratio of light reflected from sensor 91 remaining in fiber 81 will be greater than light coupling from fiber 81 into fiber 80, and propagating towards optical source 90, thus maximizing signal-to-noise ratio by maximizing the power available at detector 92.

Figure 8:
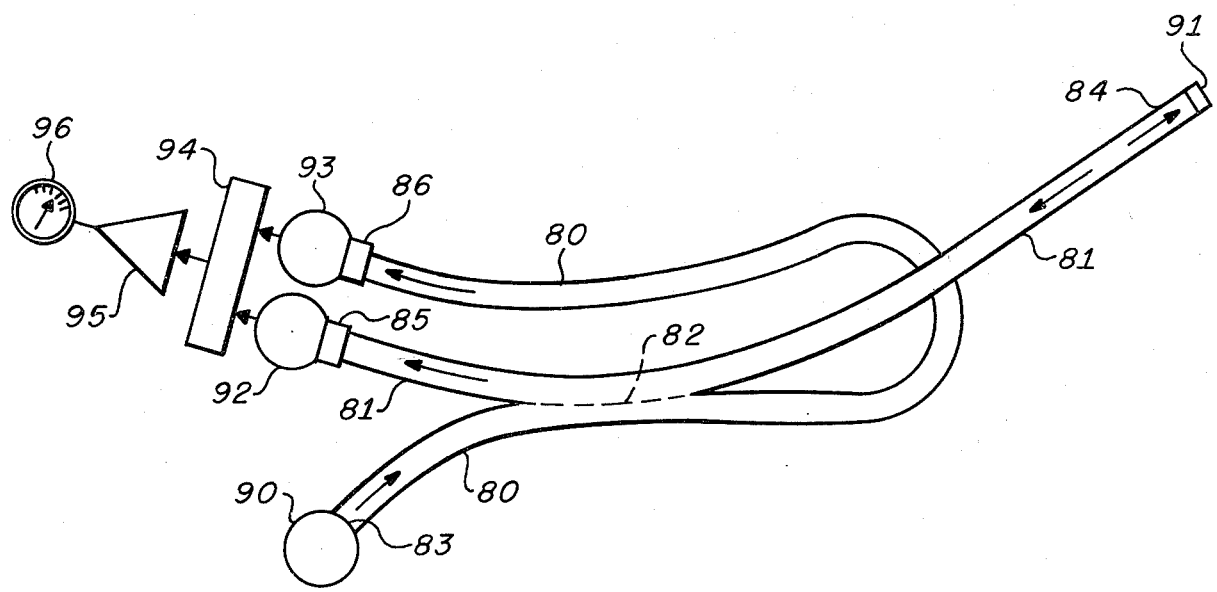

FIG. 8 shows a differential or subtractive system that minimizes intensity variations in the detected signal due to optical source fluctuations. The sensor system of FIG. 8 utilizes the fused fiber coupler of FIG. 7 and comprises optical source 90 coupled to input port 83 and sensor 91 coupled to the remaining input port 84. First and second optical detectors 92 and 93 are coupled to output ports 85 and 86, respectively, the output signals of optical detectors 92 and 93 being coupled to difference circuit 94 whose output may in turn be coupled to signal processing means 95 and is in turn coupled to utilization means 96. In operation, light signals generated in optical source 90 propagate through fiber 80, the power therefrom dividing at junction 82 part of which propagates towards sensor 91 in fiber 81, the remainder of which propagates to the second optical detector 93 as a reference signal. Light which propagates towards optical detector 91 will be reflected therefrom in accordance with the temperature detected and propagates back towards the first optical detector 92. Optical detectors 92 and 93 detect the intensity of light received from their respective output ports 85 and 86 and generate a signal corresponding in amplitude thereto. The output signals of optical detectors 92 and 93 may then be fed to a difference circuit 94 which may be a differential amplifier that generates an output signal representative of the difference between first and second optical detectors output signals. The reference signal appearing at optical detector 93 and the return signal appearing at optical detector 92 are thus subtracted from one another and instantaneous time variations in the optical source strength will be subtracted out, thereby providing more accurate and noise free signals. The output signal of difference circuit 94 may be further processed in signal processing circuit 95, which may be a preamplifier or other circuit needed to condition the signal, the output of which is in turn coupled to utilization device 96, which may be a meter or other device useful for displaying an electrical voltage or current.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. An apparatus for measuring temperature comprising:
    means for guiding light having a first index of refraction $n_1$; and
    sensor material having first and second surfaces, a temperature dependent index of refraction $n_2$, and a smoothly varying absorption characteristic to reduce reflections from said second surface, said first surface aligned with said light guiding means to form a dielectric interface therebetween whereby light incident to said interface is reflected therefrom with an intensity that varies with temperature.

2. The apparatus according to claim 1 wherein said light guiding means comprises an optical fiber.

3. The apparatus according to claim 2 wherein said sensor material comprises semiconductor material.

4. The apparatus according to claim 3 wherein said semiconductor material comprises amorphous hydrogenated silicon.

5. The apparatus according to claim 4 wherein said amorphous hydrogenated silicon comprises at least 80% silicon.

6. The apparatus according to claim 4 wherein said amorphous hydrogenated silicon comprises a hydrogenated amorphous silicon material having a varying ratio of silicon to hydrogen graded substantially smoothly from said first surface to said second surface to establish said smoothly varying absorption characteristics.

7. The apparatus according to claim 6 wherein said graded amorphous hydrogenated silicon varies from a high ratio of hydrogen to silicon at said first surface to a lower ratio of hydrogen to silicon at said second surface.

8. The temperature sensor according to claim 3 wherein said semiconductor material has a band gap energy that is greater than energy levels of said light received at said interface.

9. In a temperature sensor, the combination comprising:
optical fiber means having a first index of refraction $n_1$ for guiding light;
semiconductor sensor material having a temperature dependent index of refraction $n_2$, first and second surfaces, and a smoothly varying absorption characteristic between said first and second surfaces, said first surface aligned with said optical fiber means, to form a dielectric interface; to provide reflectance power that raises with said index of refraction $n_2$
means for detecting intensity of light reflected from said interface to determine said reflectance power; and
means coupled to receive said reflectance power for determing temperature.

10. The apparatus according to claim 9 further comprising optical coupling means adapted to receive light from an external optical source for guiding said light to said sensor material and reflected light from said dielectric interface to said reflected light determining means.

11. The apparatus according to claim 9 further comprising:
optical coupling means having means for receiving light from an external optical source, for guiding said light received from said external optical source to first terminal means and light reflected from said dielectric interface to second terminal means; and
wherein said reflected light detecting means comprises:
first detector means coupled to said first terminal means for detecting intensity of light incident thereto and providing a first signal representative thereof;
second detector means coupled to said second terminal means for detecting intensity of light incident thereto and for providing a second signal indicative thereof; and
difference means adapted to receive said first and second signals for providing a third signal representative of differences between said first and second signals.

12. An apparatus for measuring temperature comprising:
means having a first index of refraction $n_1$ for guiding light;
sensor material means having a temperature dependent index of refraction $n_2$, $n_2$ having a value $n_2'$ at a predetermined reference temperature, and first and second surfaces in substantially parallel alignment, said first surface being aligned with said light guiding means and forming a first interface therebetween for reflecting light incident thereon; and
means for reflection having third and fourth surfaces, said third surface aligned with said second surface, thereby forming a second interface for reflecting light incident thereon, said light reflected from said first and second interfaces interfering in constructive an destructive relation to provide reflectance power that varies with trremperature:
said first and second surfaces of said sensor material means having spacing therebetween to cause and reflectance power to vary with said refractive index $n_2$ substantially linearly about said value $n_2$.

13. The temperature sensor according to claim 12 wherein said sensor material comprises a semiconductor.

14. The temperature sensor according to claim 13 wherein said sensor material comprises amorphous hydrogenated silicon.

15. The temperature sensor according to claim 13 wherein said means for reflection includes a dielectric material having index of refractions $n_3$ for reflecting said light incident upon said second interface by dielectric reflection.

16. The temperature sensor according to claim 13 wherein said reflection means further comprises:
absorbing means aligned with said fourth surface for absorbing substantially all light incident thereon.

17. The apparatus according to claim 12 wherein said reflection means comprises metallic material aligned with said sensor material second surface for reflecting light incident thereupon.

18. In a temperature sensor, the combination comprising:
optical fiber means for guiding light having a first index of refraction $n_1$;
semiconductor sensor material means having a temperature dependent index of refraction $n_2$, $n_2$ having a value $n_2'$ at a predetermined temperature, and having first and second surfaces in substantially parallel alignment, said first surface being aligned with said optical fiber means and forming a first interface therebetween for reflecting light incident thereto;
means having third and fourth surfaces, said third surface being aligned with said second surface to form a second interface for reflecting light incident thereon to provide reflectance power that varies with temperature;
said first and second surfaces of said sensor material means having spacing therebetween such that said reflectance power varies with said refractive index substantially liearly about said value $n_2'$; and
means for detecting intensity of said light reflected from said first and second interfaces.

19. The temperature sensor according to claim 18 further comprising: optical coupling means having first terminal means for receiving light, second terminal means coupled to said sensor material and third terminal means, coupled to said detector means, for guiding light received at said first terminal means to said sensor material and for coupling light reflected from said first and second dielectric interfaces to said detector means.

20. The temperature sensor according to claim 18 further comprising:

optical coupling means having first terminal means adapted to receive light from an external source second terminal means coupled to said sensor material means, and third and fourth terminal means, for guiding light received at said first terminal means to said sensor means and said third terminal means and for guiding light reflected from said sensor means to said fourth terminal means;

first detector means coupled to said third terminal means for detecting intensity of light coupled from said first terminal means and for providing a first signal representative thereof;

second detector means coupled to said fourth terminal means for detecting intensity of light received therefrom and for providing a second signal representative thereof; and difference means for determining differences between said first and second signals and for providing a third signal representative thereof.

* * * * *